(12) United States Patent
Chao

(10) Patent No.: US 9,899,644 B2
(45) Date of Patent: Feb. 20, 2018

(54) BATTERY MODULE AND ITS ADHESIVE STRAP

(71) Applicant: GETAC TECHNOLOGY CORPORATION, Hsinchu (TW)

(72) Inventor: Po-Tsun Chao, Taipei (TW)

(73) Assignee: Getac Technology Corporation, Hsinchu County (TW)

(*) Notice: Subject to any disclaimer, the term of this patent is extended or adjusted under 35 U.S.C. 154(b) by 156 days.

(21) Appl. No.: 14/951,458

(22) Filed: Nov. 24, 2015

(65) Prior Publication Data

US 2016/0079577 A1    Mar. 17, 2016

Related U.S. Application Data

(62) Division of application No. 13/706,278, filed on Dec. 5, 2012, now abandoned.

(60) Provisional application No. 61/568,092, filed on Dec. 7, 2011.

(30) Foreign Application Priority Data

May 18, 2012    (CN) .......................... 2012 1 0155240

(51) Int. Cl.
*H01M 2/10*      (2006.01)
*H01M 10/052*   (2010.01)
*H01M 2/02*      (2006.01)

(52) U.S. Cl.
CPC ....... *H01M 2/1016* (2013.01); *H01M 2/0257* (2013.01); *H01M 2/1022* (2013.01); *H01M 2/1072* (2013.01); *H01M 10/052* (2013.01)

(58) Field of Classification Search
CPC .......... H01M 2/10106; H01M 2/1022; H01M 1/1072
See application file for complete search history.

(56) References Cited

U.S. PATENT DOCUMENTS 4,733,440 A * 3/1988 Ogawa ................... A44B 11/06
                                                         24/170
8,973,883 B2 * 3/2015 Meier ................. H01M 2/1083
                                                         180/68.5

FOREIGN PATENT DOCUMENTS

CN          1218302 A      6/1999
CN        201995742 U    10/2011

* cited by examiner

*Primary Examiner* — Stewart A Fraser
*Assistant Examiner* — Rachel L Zhang

(57) ABSTRACT

A battery module includes a battery pack, a strap, and an adjuster. The strap has an attached portion, an adjusted portion and a fixed portion. The attached portion is attached to the battery pack, and the adjusted portion extends from one side of the attached portion. The fixed portion extends from the other side of the attached portion. The adjuster is positioned on the adjusted portion and has a buckle and an elastic element. The buckle is positioned between the elastic element and the battery pack. The elastic element and the battery pack oppose to the same side of the strap. The adjusted portion of the strap passes through the buckle. The battery pack with the strap and the adjuster is fixed on the plate base for protecting itself against outside damage.

20 Claims, 6 Drawing Sheets

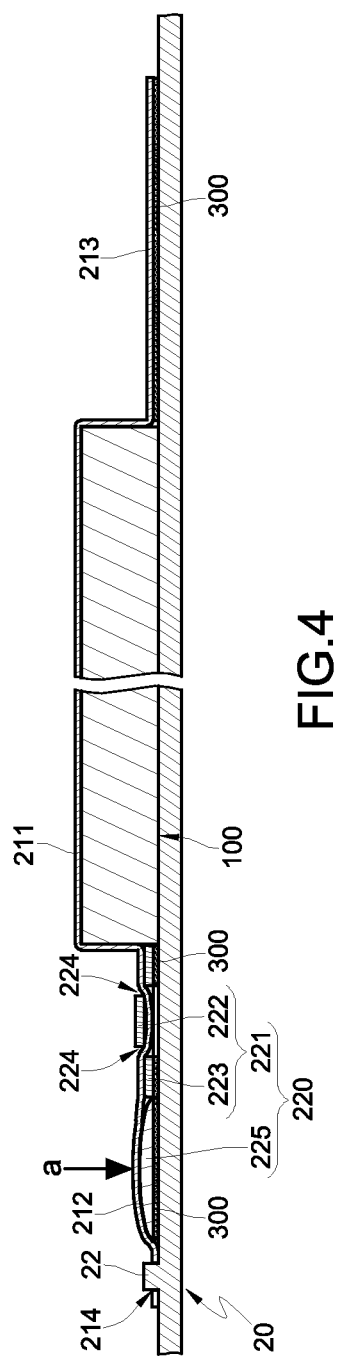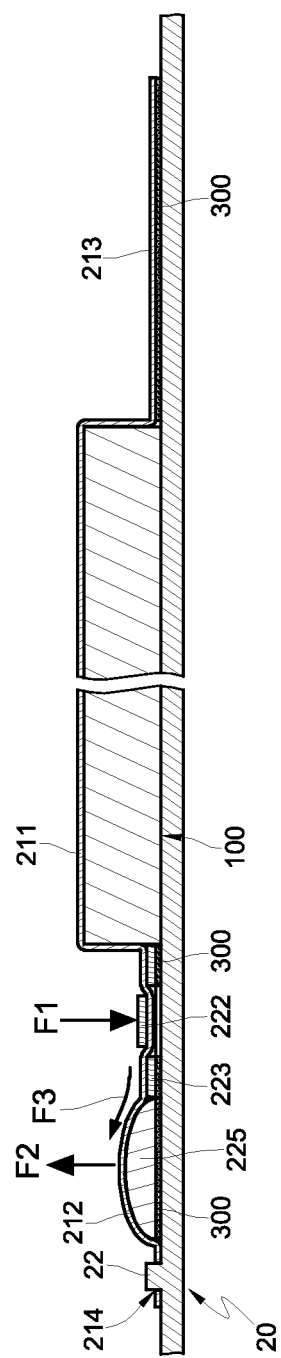

BATTERY MODULE AND ITS ADHESIVE STRAP

This application is a divisional of U.S. application Ser. No. 13/706,278, filed Dec. 5, 2012, the entire disclosure of which is hereby incorporated by reference, which claims the benefit of U.S. Provisional Application No. 61/568,092, filed on Dec. 7, 2011.

BACKGROUND

Technical Field

The present disclosure relates to a battery module, and more particularly, to a battery module having an adhesive strap.

Related Art

Lithium battery is widely used in various electronic devices because of its advantages of high energy conversion efficiency, long life span and high stability. However, the pressure inside the lithium battery changes when the lithium battery is in operation. In order to solve the problem of the pressure changing, a conventional lithium battery is packed with a ductile pouch instead of a hard case. Such a lithium battery is called laminated polymer battery.

Because the laminated polymer battery can be conveniently assembled with a case of the electronic device, the laminated polymer battery is directly adhered on the case by a double-sided tape. However, during the process of removing the laminated polymer battery, a battery core in the laminated polymer battery can be torn and damaged by the adhesiveness of a double-sided tape.

SUMMARY

In an embodiment, a battery module of the disclosure comprises a battery pack, a strap, and an adjuster. The strap has an attached portion, an adjusted portion and a fixed portion. The attached portion is attached to the battery pack, and the adjusted portion extends from one side of the attached portion. The fixed portion extends from the other side of the attached portion. The adjuster is positioned on the adjusted portion and has a buckle and an elastic element. The buckle is positioned between the elastic element and the battery pack, and includes a press strip. and the elastic element and the press strip separately are positioned on the different sides of the strap. The adjusted portion of the strap passes through the buckle.

In an embodiment, a battery module of the disclosure comprises a battery pack, a strap, at least one adjuster, and a housing. The strap has an attached portion, an adjusted portion and a fixed portion. The adjusted portion and the fixed portion are separately positioned on both ends of the strap. The attached portion is between the adjusted portion and the fixed portion, and attached to the battery pack. The adjuster includes a buckle and an elastic element. The battery pack is securely attached to the housing by the strap, the buckle and the elastic element.

In an embodiment, an adhesive strap of the present disclosure for adhering on a battery pack comprises a strap and an adjuster. The strap has an attached portion, an adjusted portion and a fixed portion. The attached portion is attached to the battery pack. The adjusted portion extends from one side of the attached portion. The fixed portion extends from the other side of the attached portion. The adjuster is positioned on the adjusted portion and has a buckle and an elastic element. The buckle is positioned between the elastic element and the attached portion. The adjusted portion of the strap passes through the buckle.

In an embodiment, a battery module of the present disclosure comprises a battery pack, a strap, a first adjuster and a second adjuster. The strap has an attached portion, a first adjusted portion and a second adjusted portion. The attached portion is attached to the battery pack. The first adjusted portion extends from one side of the attached portion. The second adjusted portion extends from the other side of the attached portion. The first adjuster is positioned on the first adjusted portion, and has a first buckle and a first elastic element. The first buckle is positioned between the first elastic element and the battery pack. The first elastic element and the battery pack oppose to the same side of the strap. The second adjuster is positioned on the second adjusted portion and has a second buckle and a second elastic element. The second buckle is positioned between the second elastic element and the battery pack. The second elastic element and the battery pack oppose to the same side of the strap. The first adjusted portion passes through the first buckle, and the second adjusted portion passed through the second buckle.

BRIEF DESCRIPTION OF THE DRAWINGS

The present disclosure will become more fully understood from the detailed description given herein below for illustration only, and thus are not limitative of the present disclosure, and wherein:

FIG. 4 is an illustration of an assembling process according to FIG. 1;

FIG. 5 is a view illustrating a force applied according to FIG. 1;

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

Figure 1:
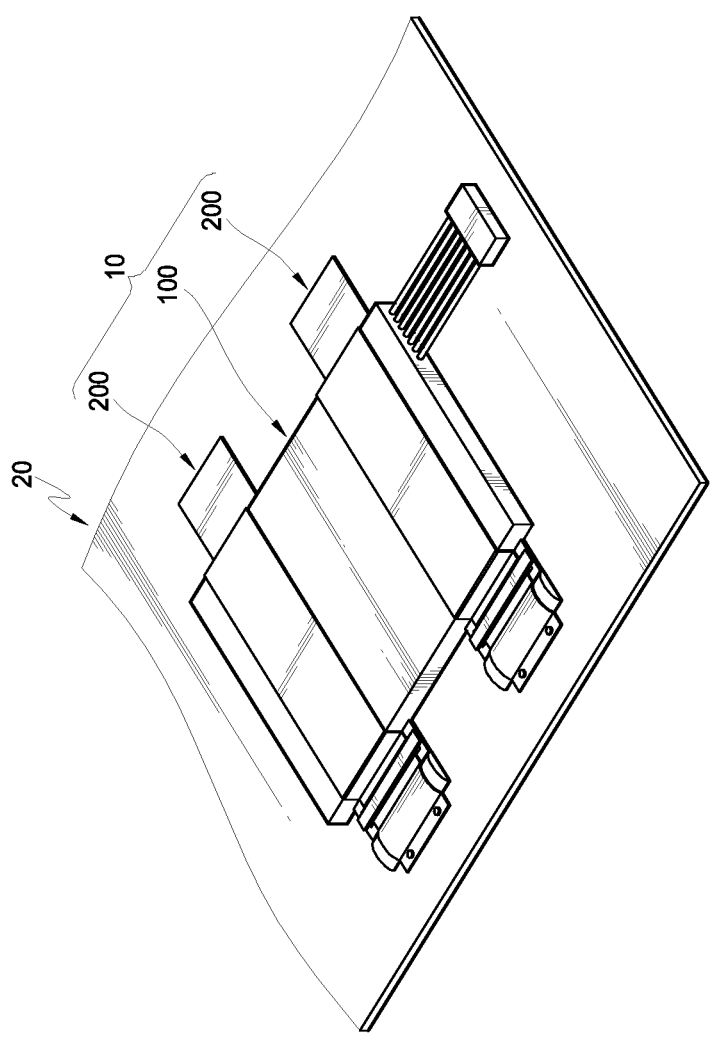
FIG. 1 is a perspective view of a battery module according to an embodiment of the disclosure.
Figure 2:
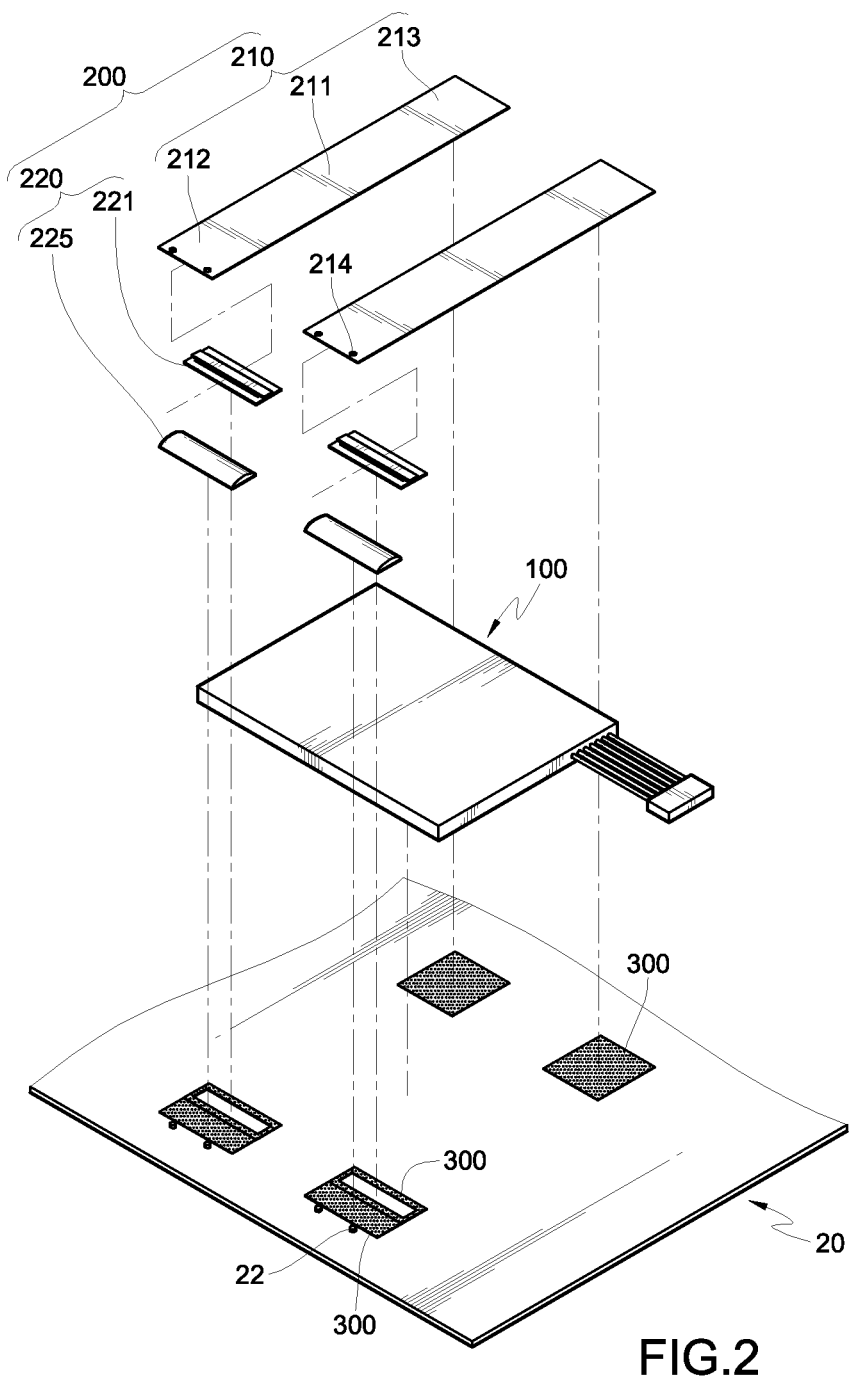
FIG. 2 is an exploded perspective view of FIG. 1.
Figure 3:
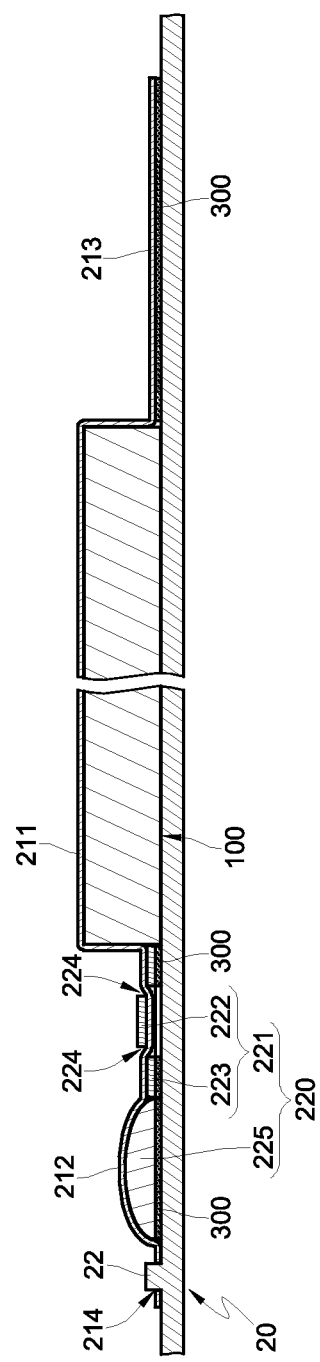
FIG. 3 is a cross-sectional view of FIG. 1.

Please refer to FIGS. 1 to 3. FIG. 1 is a perspective view of a battery module according to an embodiment of the disclosure. FIG. 2 is an exploded perspective view of FIG. 1. FIG. 3 is a cross-sectional view of FIG. 1.

A battery module 10 of the embodiment comprises a battery pack 100 and at least one adhesive strap 200. In this embodiment, the battery module 10 comprises the two adhesive straps 200 as an example. The adhesive straps 200 are used for fixing the battery pack 100 on a plate base 20. The battery pack 100 can be a laminated polymer battery, but is not limited to the embodiment. A plurality of battery cores are positioned inside the battery pack 100. Each of the adhesive straps 200 comprises a strap 210 and an adjuster 220. The strap 210 comprises an attached portion 211, an adjusted portion 212 and a fixed portion 213. The attached portion 211 is attached to the battery pack 100. The adjusted portion 212 extends from one side of the attached portion 211. The fixed portion 213 extends from the other side of the attached portion 211. Moreover, the adjuster 220 is positioned on the adjusted portion 212. The adjuster 220 comprises a buckle 221 and an elastic element 225. The buckle 221 is positioned between the elastic element 225 and the battery pack 100. The elastic element 225 and the battery pack 100 oppose to the same side of the strap 210. The adjusted portion 212 passes through the buckle 221. Moreover, the buckle 221 in this embodiment comprises a press strip 222 and an adhering plate 223. The elastic element 225 and the press strip 222 are separately positioned on different sides of the strap 210. The press strip 222 and the adhering plate 223 form a spacer. Two apertures 224 are separately formed by two sides of the press strip 222 and the adhering plate 223. The strap 210 passes through the aperture 224 in one side of the buckle 221, passes through the spacer of the buckle 221, and then goes out of the aperture 224 in another side of buckle 221.

The battery pack 100 of the battery module 10 in this embodiment is fixed on the plate base 20 by the strap 210. The adhering plate 223, the elastic element 225 and the fixed portion 213 have one of the adhesive layers 300 respectively. One of the adhesive layers 300 is positioned on a side of the adhering plate 223 facing oppositely from the adjusted portion 212. Another adhesive layer 300 is positioned on a side of the elastic element 225 facing oppositely from the adjusted portion 212. The other adhesive layer 300 is positioned on a side of the fixed portion 213 facing the battery pack 100.

In this embodiment, a positioning hole 214 is further positioned on an end of the adjusted portion 212. The elastic element 225 is positioned between the positioning hole 214 and the buckle 221. The plate base 20 comprises a positioning column 22. The positioning column 22 is fitted into the positioning hole 214 so that the strap is positioned relatively to the plate base 20.

Please refer to FIGS. 3 to 5. FIG. 4 is an illustration of an assembling process according to FIG. 1. FIG. 5 is a view illustrating a force applied according to FIG. 1. Assembling steps for the battery module 10 and the plate base 20 are as follows. First, the fixed portion 213 is attached to the plate base 20 by the adhesive layer 300. Next, the positioning columns 22 of the plate base 20 is fitted into the positioning hole 214 of the adjusted portion 212; meanwhile, the adhesive layers 300 on the adhering plate 223 and the elastic element 225 are attached to the plate base 20. Also, while the elastic element 225 is attached to the plate base 20, the elastic element 225 needs to be pressed at the same time along a direction of an arrow a. After the adhering plate 223 and the elastic element 225 are attached to the plate base 20 for a period of time, the compressed elastic element 225 starts to expand gradually because of the release of stress.

As shown in FIG. 5, the press strip 222 and the elastic element 225 are positioned on the two opposite sides of the strap 210 respectively. When the elastic element 225 expands, the strap 210 is pushed away from the plate base 20 by an acting force F2 provided by the expanding elastic element 225. At the same time, the strap 210 is pressed towards the plate base 20 by an acting force F1 provided by the press strip 222. Therefore, a tension F3 is produced at the adjusted portion 212 because of the pulling force between the press strip 222 and the elastic element 225. The adjusted portion 212 is tightened by the tension F3. Furthermore, the attached portion 211 is drawn towards the plate base 20 because of the tension of the adjusted portion 212 and that of the fixed portion 213. Therefore, the battery pack 100 can be fixed effectively.

As described above, during the process of removing the battery pack 100 from the plate base 20, the positioning hole 214 may be detached from the positioning columns 22 first. Then, the adhesive straps 200 are peeled off from the plate base 20 so as to have the battery pack 100 removed. That is, the adhesive layers 300 are not attached between the battery pack 100 and the plate base 20. Therefore, when the battery pack 100 is removed from the plate base 20, there is no external damage to the battery pack 100.

Another embodiment of the present invention, similar to the above mentioned embodiment, is presented here. Please refer to FIGS. 1, 2, and 3. The battery module 10 of the present embodiment is applicable to the personal computers, which comprises a battery pack 100, a strap 210, a protective housing 20, and at least one adjuster 220. The strap 210 includes an attached portion 211, an adjusted portion 212, and a fixed portion 213. The adjusted portion 212 and the fixed portion 213 are separately positioned on both ends of the strap 210. The attached portion 211 is positioned between the adjusted portion 212 and the fixed portion 213, and attached to battery pack 100. The adjuster 220 includes a buckle 221 and an elastic element 225.

Furthermore, the battery pack 100 is securely attached to the protective housing 20 by a strap 210, a buckle 221, and an elastic element 225. The fixed portion 213 of the strap 210 is securely attached to the protective housing 20 by an adhesive layer 300. The adhesive layer 300 is positioned between the fixed portion 213 of the strap 210 and the protective housing 20. The buckle 221 includes an adhering plate 223 and a press strip 222. The adhering plate 223 and the press strip 222 form a spacer. Two apertures 224 are separately formed by two sides of the press strip 222 and the adhering plate 223. The strap 210 passes through the aperture 224 in one side of the buckle 221, passes through the spacer of the buckle 221, and then goes out of the aperture 224 in another side of buckle 221.

As described above, the tightness of the strap 210 itself can be adjusted by the buckle 221 and the elastic element 225 so that the battery pack 100 is securely attached to the protective housing 20. After appropriately adjusting the tightness of the strap 210, the strap 210 is fixed on the protective housing 20 by the adhesive layers 300.

Figure 6:
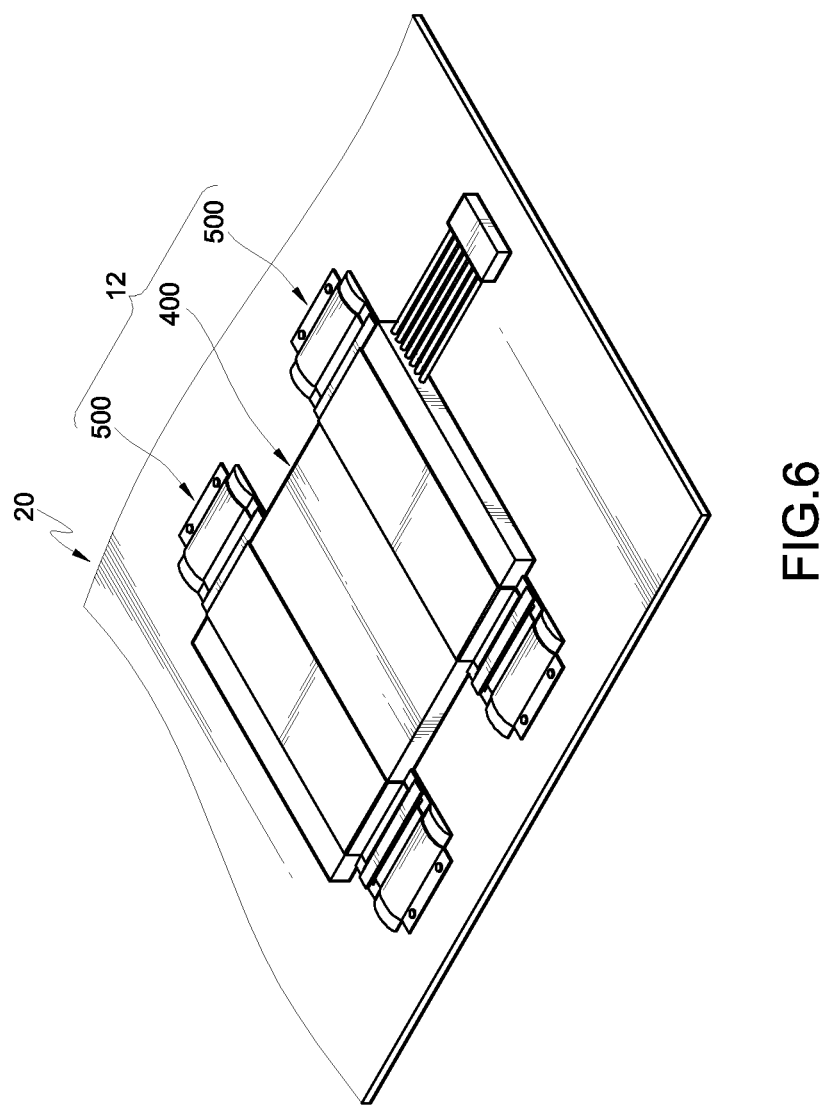
FIG. 6 is a perspective view of the battery module according to another embodiment of the disclosure.
Figure 7:
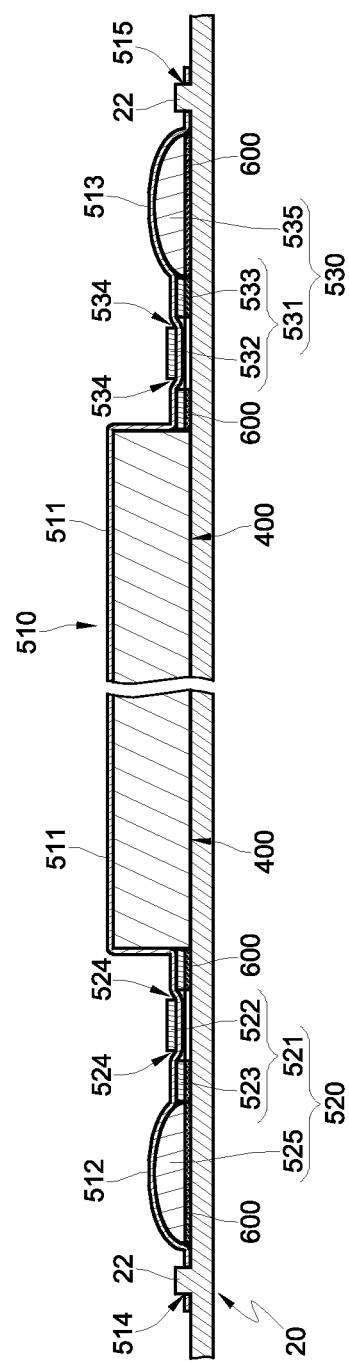
FIG. 7 is a cross-sectional view of FIG. 6.

In the structure of this embodiment, the adhesive layer 300 is positioned between the strap 210 and the protective housing 20 instead of being positioned between the battery pack 100 and the protective housing 20. Therefore, when the battery pack 100 is removed from the protective housing 20, there is no external damage to the battery pack 100. Please refer to FIGS. 6 and 7. FIG. 6 is a perspective view of the battery module according to another embodiment of the disclosure. FIG. 7 is a cross-sectional view of FIG. 6. A battery module 12 in this embodiment comprises a battery pack 400 and two adhesive straps 500. Each of the adhesive straps 500 comprises a strap 510, a first adjuster 520 and a second adjuster 530. The strap 510 comprises an attached portion 511, a first adjusted portion 512 and a second adjusted portion 513. The attached portion 511 is attached to the battery pack 400. The first adjusted portion 512 extends from one side of the attached portion 511. The second adjusted portion 513 extends from the other side of the attached portion 511.

The first adjuster 520 is positioned on the first adjusted portion 512. The first adjuster 520 comprises a first buckle 521 and a first elastic element 525.

The second adjuster 530 is positioned on the second adjusted portion 513. The second adjuster 530 comprises a second buckle 531 and a second elastic element 535.

The first buckle 521 includes a first press strip 522 and a first adhering plate 523. The second buckle 531 includes a second press strip 532 and a second adhering plate 533. The first adjusted portion 512 passes through the first buckle 521. The second adjusted portion 513 passes through the second buckle 531. The first elastic element 525, the second elastic element 535 and the battery pack 400 are positioned on the same side of the strap 510. The first buckle 521 is positioned between the first elastic element 525 and the battery pack 400. The second buckle 531 is positioned between the second elastic element 535 and the battery pack 400. The first elastic element 525 and the first press strip 522 of the first buckle 521 are oppositely positioned against the strap 510. The second elastic element 535 and the second press strip 532 of the second buckle 531 are oppositely positioned against the strap 510.

In this embodiment, the first press strip 522 and the first adhering plate 523 form a spacer. Two apertures 524 are separately formed by two sides of the first press strip 522 and the first adhering plate 523. The strap 510 passes through the aperture 524 in one side of the first buckle 521, passes through the spacer of the first buckle 521, and then goes out of the aperture 224 in another side of first buckle 521. The second press strip 532 and the second adhering plate 533 form a spacer. Two apertures 534 are separately formed by two sides of the second press strip 532 and the second adhering plate 533. The strap 510 passes through the aperture 224 in one side of the second buckle 531, passes through the spacer of the second buckle 531, and then goes out of the aperture 224 in another side of second buckle 531.

The first adhering plate 523 of the first buckle 521, the second adhering plate 533 of the second buckle 531, the first elastic element 525 and the second elastic element 535 have one of adhesive layers 600 respectively. One of the four adhesive layers 600 is positioned on a side of the first adhering plate 523 of the first buckle 521 facing oppositely from the first adjusted portion 512. One of the other adhesive layers 600 is positioned on a side of the second adhering plate 533 of the second buckle 531 facing oppositely from the second adjusted portion 513. Another adhesive layer 600 is positioned on a side of the first elastic element 525 facing oppositely from the first adjusted portion 512. The other adhesive layer 600 is positioned on a side of the second elastic element 535 facing oppositely from the second adjusted portion 513.

Moreover, in this embodiment, a first positioning hole 514 and a second positioning hole 515 are further positioned on an end of the first adjusted portion 512 and an end of the second adjusted portion 513 respectively. The first elastic element 525 is positioned between the first positioning hole 514 of the first adjusted portion 512 and the first buckle 521. The second elastic element 535 is positioned between the second positioning hole 515 of the second adjusted portion 513 and the second buckle 531.

According to the battery module and its adhesive strap disclosed in the above embodiments, the adhesive layers positioned originally between the battery pack and the plate base has been changed to the middle of the plate base and the adhesive strap. That is, the battery pack can be fixed on or removed from the plate base by a combination as well as a separation of the adhesive strap and the plate base. Therefore, when the battery pack is removed, the battery pack avoids tear damage because the adhesive layers are only positioned between the adhesive strap and the plate base. Then, the adhesive straps are peeled off from the plate base so as to have the battery pack removed. That is, the adhesive layers are not attached between the battery pack and the plate base Therefore, when the battery pack is removed from the plate base, there is no external damage to the battery pack.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A battery module fixable to a base plate, the battery module comprising:
   a battery pack disposed on the base plate;
   a strap having an attached portion, an adjusted portion and a fixed portion, said attached portion being covering a portion of said battery pack, said adjusted portion extended from one side of said attached portion, and said fixed portion extended from the other side of said attached portion and fixed to the base plate; and
   an adjuster having a buckle and an elastic element, said buckle positioned between said elastic element and said battery pack, said elastic element and said battery pack opposed to the same side of said strap, and said adjuster fixed to the base plate;
   wherein said adjusted portion of said strap passes through said buckle, over the elastic element, and is fixed to the base plate, such that the adjusted portion compresses the elastic element, and the battery pack is secured to the base plate by the attached portion.

2. The battery module as claimed in claim 1, wherein said buckle includes a press strip and an adhering plate, said press strip and said adhering plate form a spacer, and two apertures are separately formed by two sides of said press strip and said adhering plate.

3. The battery module as claimed in claim 2, wherein said strap passes through said aperture in one side of said buckle, passes through said spacer of said buckle, and goes out of said aperture in another side of said buckle.

4. The battery module as claimed in claim 2, wherein said adhering plate and said elastic element each include an adhesive layer adhered to the base plate, one of said adhesive layers is positioned on a side of said adhering plate facing oppositely from said adjusted portion, and the other one of said adhesive layers is positioned on a side of said elastic element facing oppositely from said adjusted portion.

5. The battery module as claimed in claim 1, wherein said adjusted portion comprises a positioning hole positioned on an end of said adjusted portion, said elastic element is positioned between said positioning hole and said buckle, and said adjusted portion is fixed to the base plate by fitting a positioning column of the base plate into the positioning hole.

6. The battery module as claimed in claim 1, wherein said fixed portion comprises an adhesive layer positioned on a side of said strap facing said battery pack and adhered to the base plate.

7. An adhesive strap for fixing a battery pack to a base plate, comprising:
   a strap having an attached portion, an adjusted portion and a fixed portion, said attached portion covering a portion of said battery pack, said adjusted portion extended from one side of said attached portion, and said fixed portion extended from the other side of said attached portion and fixed to the base plate; and an adjuster having a buckle and an elastic element, said buckle positioned between said elastic element and said attached portion, and said adjuster fixed to the base plate;

wherein said adjusted portion of said strap passes through said buckle, over the elastic element, and is fixed to the base plate, such that the adjusted portion compresses the elastic element, and the battery pack is secured to the base plate by the attached portion.

8. The adhesive strap as claimed in claim 7, wherein said buckle comprises a press strip and an adhering plate, said press strip and said adhering plate form a spacer, and two apertures are separately formed by two sides of said press strip and said adhering plate.

9. The adhesive strap as claimed in claim 8, wherein said adhering plate and said elastic element have an adhesive layer adhered to the base plate, one of said adhesive layers is positioned on a side of said adhering plate facing oppositely from said adjusted portion, and the other one of said adhesive layers is positioned on a side of said elastic element facing oppositely from said adjusted portion.

10. The adhesive strap as claimed in claim 7, wherein said adjusted portion comprises a positioning hole positioned on an end of said adjusted portion, said elastic element is positioned between said positioning hole and said buckle, and said adjusted portion is fixed to the base plate by fitting a positioning column of the base plate into the positioning hole.

11. The adhesive strap as claimed in claim 7, wherein said fixed portion has an adhesive layer positioned on a side of said strap facing said battery pack and adhered to the base plate.

12. A battery module fixable to a base plate, the battery module comprising:
a battery pack disposed on the base plate;
a strap having an attached portion, a first adjusted portion and a second adjusted portion, said attached portion covering a portion of said battery pack, said first adjusted portion extended from one side of said attached portion, and said second adjusted portion extended from the other side of said attached portion;
a first adjuster having a first buckle and a first elastic element, said first buckle positioned between said first elastic element and said battery pack, said first elastic element and said battery pack opposed to the same side of said strap, and said first adjuster fixed to the base plate; and
a second adjuster having a second buckle and a second elastic element, said second buckle positioned between said second elastic element and said battery pack, said second elastic element and said battery pack opposed to the same side of said strap, and said second adjuster fixed to the base plate;
wherein said first adjusted portion passes through said first buckle, over the first elastic element, and is fixed to the base plate, such that the first adjusted portion compresses the first elastic element, and said second adjusted portion passes through said second buckle, over the second elastic element, and is fixed to the second base plate, such that the first adjusted portion compresses the first elastic element, such that the battery pack is secured to the base plate by the attached portion.

13. The battery module as claimed in claim 12, wherein said first buckle comprises a first adhering plate and a first press strip, said second buckle comprises a second adhering plate and a second press strip, said first adhering plate and said first press strip form a spacer, and two apertures are separately formed by two sides of said press strip and said adhering plate.

14. The battery module as claimed in claim 13, wherein said first adhering plate, said second adhering plate, said first elastic element and said second elastic element have an adhesive layer adhered to the base plate, said four adhesive layers are respectively positioned on a side of said first adhering plate facing said first adjusted portion, on a side of said second adhering plate facing said second adjusted portion, on a side of said first elastic element facing said first adjusted portion and on a side of said second elastic element facing said second adjusted portion.

15. The battery module as claimed in claim 12, wherein first adjusted portion comprises a first positioning hole positioned on an end of said first adjusted portion, and said second adjusted portion comprises a second positioning hole positioned on an end of said second adjusted portion, said first elastic element is positioned between said first positioning hole and said first buckle, and said second elastic element is positioned between said second positioning hole and said second buckle, and said first adjusted portion is fixed to the base plate by fitting a first positioning column of the base plate into the first positioning hole, and said second adjusted portion is fixed to the base plate by fitting a second positioning column of the base plate into the second positioning hole.

16. A battery module, comprising:
a housing;
a battery pack disposed on a base plate of the housing;
a strap having an attached portion, an adjusted portion and a fixed portion, said adjusted portion and said fixed portion separately positioned on both ends of said strap, said attached portion positioned between said adjusted portion and said fixed portion, said fixed portion being fixed to the base plate, and said attached portion covering a portion of said battery pack; and
at least one adjuster, including a buckle and an elastic element, said adjuster being fixed to the base plate;
wherein said adjusted portion of said strap passes through said buckle, over the elastic element, and is fixed to the base plate, such that the adjusted portion compresses the elastic element, and the battery pack is secured to the base plate by the attached portion.

17. The battery module as claimed in claim 16, wherein said fixed portion of said strap is fixed to said base plate of said housing by an adhesive layer.

18. The battery module as claimed in claim 16, wherein said buckle includes an adhering plate and a press strip, said adhering plate and said press strip form a spacer, and two apertures are separately formed by two sides of said press strip and said adhering plate.

19. The battery module as claimed in claim 18, wherein said strap passes through said aperture in one side of said buckle, passes through said spacer of said buckle, and goes out of said aperture in another side of said buckle.

20. The battery module as claimed in claim 16, wherein said base plate comprises a positioning column, and said adjusted portion comprises a positioning hole positioned on an end of said adjusted portion, said elastic element is positioned between said positioning hole and said buckle, and said adjusted portion is fixed to the base plate by fitting the positioning column into the positioning hole.

* * * * *